(12) United States Patent
Aubert et al.

(10) Patent No.: US 12,147,238 B2
(45) Date of Patent: Nov. 19, 2024

(54) DEVICE FOR PLANNING A PATH AND/OR TRAJECTORY FOR A MOTOR VEHICLE

(71) Applicants: RENAULT s.a.s., Boulogne-Billancourt (FR); NISSAN MOTOR CO., LTD., Yokohama (JP)

(72) Inventors: Sebastien Aubert, Nice (FR); Jean-Pierre Giacalone, Biot (FR); Philippe Weingertner, Fayence (FR)

(73) Assignees: AMPERE S.A.S., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 705 days.

(21) Appl. No.: 17/279,388

(22) PCT Filed: Sep. 27, 2019

(86) PCT No.: PCT/EP2019/076315
§ 371 (c)(1),
(2) Date: Mar. 24, 2021

(87) PCT Pub. No.: WO2020/065070
PCT Pub. Date: Apr. 2, 2020

(65) Prior Publication Data
US 2021/0397194 A1   Dec. 23, 2021

(30) Foreign Application Priority Data
Sep. 28, 2018 (FR) ........................ 1858980

(51) Int. Cl.
*G05D 1/00*  (2024.01)
*G06F 18/214*  (2023.01)
(Continued)

(52) U.S. Cl.
CPC ......... *G05D 1/0221* (2013.01); *G05D 1/0268* (2013.01); *G06F 18/214* (2023.01); *G06N 3/044* (2023.01); *G06N 7/01* (2023.01)

(58) Field of Classification Search
CPC .. G05D 1/0221; G05D 1/0268; G05D 1/0212; G06F 18/214; G06N 3/044;
(Continued)

(56) References Cited

U.S. PATENT DOCUMENTS 10,013,773 B1   7/2018 Ogale et al.
10,460,251 B2 * 10/2019 Okanohara .............. G06N 7/01
(Continued)

FOREIGN PATENT DOCUMENTS

FR          3 046 006 A1    6/2017
WO    WO 2018/129850 A1    7/2018

OTHER PUBLICATIONS

International Search Report issued on Dec. 19, 2019 in PCT/EP2019/076315 filed on Sep. 27, 2019, 2 pages.

*Primary Examiner* — Jason Holloway
*Assistant Examiner* — Madison B Emmett
(74) *Attorney, Agent, or Firm* — Oblon, McClelland, Maier & Neustadt, L.L.P.

(57) ABSTRACT

A device for planning a path and/or a trajectory for a motor vehicle includes a module for receiving a sequence of input variables and hardware and software for determining a control law corresponding to the path and/or the trajectory according to the sequence of input variables received. The device includes a temporal classification unit in a set of compact representations.

14 Claims, 3 Drawing Sheets

Figure 1:
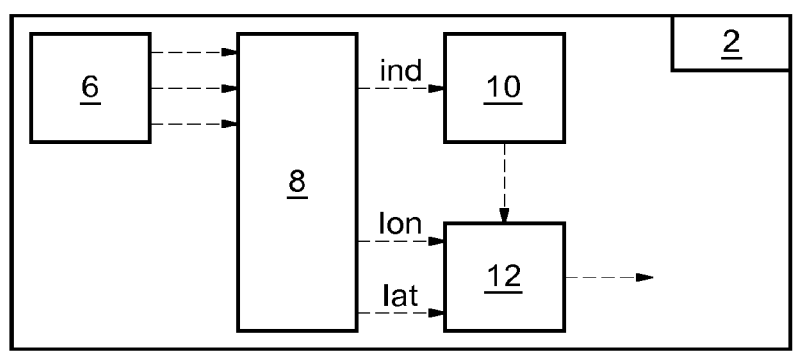

(51) Int. Cl.
*G06N 3/044* (2023.01)
*G06N 7/01* (2023.01)

(58) Field of Classification Search
CPC .. G06N 7/01; G01C 21/3446; G01C 21/3453; G01C 21/3691
See application file for complete search history.

(56) References Cited

U.S. PATENT DOCUMENTS

| | | | |
|---|---|---|---|
| 10,606,278 B2* | 3/2020 | Shalev-Shwartz | ............................ G01C 21/3602 |
| 2018/0209808 A1 | 7/2018 | Wang et al. | |
| 2018/0253647 A1* | 9/2018 | Yu | ........................ G06F 18/2413 |
| 2019/0184561 A1* | 6/2019 | Yip | ........................ G06N 3/044 |
| 2019/0361454 A1* | 11/2019 | Zeng | ..................... G05D 1/0214 |
| 2020/0066067 A1* | 2/2020 | Herman | ..................... G07C 5/08 |
| 2020/0174490 A1* | 6/2020 | Ogale | ..................... G06N 3/084 |
| 2021/0216797 A1* | 7/2021 | Joos | ........................ G08G 1/147 |
| 2021/0224593 A1* | 7/2021 | Wu | ................... G06F 18/24155 |

* cited by examiner

DEVICE FOR PLANNING A PATH AND/OR TRAJECTORY FOR A MOTOR VEHICLE

The present application relates to the field of devices and methods for planning a path and/or a trajectory for a motor vehicle, and computer programs for implementing such methods.

Motor vehicles are currently equipped with advanced driving assistance devices with improving levels of performance. An advanced driving assistance device is intended to allow the autonomous driving of a motor vehicle, that is to say driving without intervention by a driver. In particular, an advanced driving assistance device may serve to plan a path and/or a trajectory for a motor vehicle. In the present application, the term "plan" and its derivatives will be interpreted in the sense of their usual definition in the field of advanced driving assistance devices, namely to the effect that the planning of a path or a trajectory signifies a succession of states (position, speed, acceleration) of the motor vehicle in the future corresponding to the path or the trajectory from one state to another desired state. In the present application, the path of a vehicle will be understood as a geometric form corresponding to the progress of a vehicle between a point of departure and a point of arrival. The trajectory of a vehicle will be understood as the change with time of the position of the vehicle between the point of departure and the point of arrival.

Known examples of methods for planning a path and/or a trajectory of a motor vehicle comprise, notably, methods of planning by solving an optimal control problem modeled on the basis of first-order Lagrangian mechanics equations. Methods for generating a path and/or trajectory are usually intended to find a good compromise between the comfort of the vehicle's occupants and safety.

An example of a method (hereinafter "the Werling method") for generating a trajectory may be found in the paper "Optimal trajectory generation for dynamic street scenarios in a Frenét frame, IEEE International Conference on Robotics and Automation", by M. Werling, J. Ziegler, S. Kammel and S. Thrun [1]. The Werling method relates to an indirect approach to solving the optimal control problem. According to this approach, some of the input parameters are selected, the optimal control problem is solved partially by taking into account only the selected input parameters, and the solution is verified a posteriori, using the unselected input parameters and the selected input parameters. However, the use of an indirect approach lacks robustness, owing to the large number of input parameters to be taken into account. Moreover, the fact that the collision avoidance constraints are verified a posteriori may result in the planning of numerous paths and/or trajectories that are finally rejected because of the collision risk, so that many resources are used for a large amount of rejected calculations.

Another example of a trajectory planning method (hereinafter "the Mercy method") is described in the paper "Time-optimal motion planning in the presence of moving obstacles", by T. Mercy, W. Van Loock, G. Pipeleers and J. Swevers. [2]. This example uses a direct approach to solving the optimal control problem. According to the direct approach, all the constraints are considered in the solving of the problem. Consequently the present invention is closer to the Mercy method than to the Werling method. However, the complexity of the algorithm associated with the Mercy method makes it impossible to incorporate into a device on board a motor vehicle.

Other examples of path and/or trajectory planning methods comprise potential field methods, in which each obstacle generates an anti-gravity field tending to prevent the vehicle from approaching it. However, such methods entail a risk of blocking in a local minimum, and therefore may fail to generate the best solution to the problem of path and/or trajectory planning.

In view of the above, the object of the invention is to enable a path and/or a trajectory for a motor vehicle to be planned while overcoming the aforementioned drawbacks.

More particularly, the invention proposes to enable the implementation of path and/or trajectory generation that is sufficiently robust, while reducing the calculation complexity.

For this purpose, a device for planning a path and/or a trajectory for a motor vehicle is proposed, comprising a module for receiving a sequence of input variables and hardware and software means for determining a control law corresponding to the path and/or the trajectory according to the sequence of input variables received.

According to one of its general characteristics, the device comprises a temporal classification means in a set of compact representations.

By using a temporal classification means it is possible to plan a path and/or a trajectory on the basis of a history. Such an approach enables all the input parameters to be taken into account, as in the Mercy method, while having a relatively low complexity. In fact, the use of a temporal classification means requires a large amount of work for the design and adjustment of the algorithm, but requires a small amount of work for the inference phase of planning. The calculation resource requirement is thus shifted from the on-line inference situation to an off-line training phase.

In the present application, the expression "control law" will be interpreted in the sense that a control law corresponding to a path or a trajectory comprises the set of commands required to operate the actuators to make the vehicle follow the path or trajectory, while modeling the physical constraints of the chassis.

The expression "temporal classification" denotes the action of classifying a plurality of input sequences which are a function of time.

The expression "set of compact representations" denotes a set formed by the input sequences that have undergone an operation of changing to a compact state; that is to say, for example, a loss of the notion of time in the input sequence, or a removal of some points of the input sequence, with the aim of reducing their memory footprint.

According to one embodiment, the temporal classification means is configured for defining a surjection of a set of inputs composed of different sequences of input variables of variable lengths toward a set of outputs composed of different sequences of output variables of variable lengths.

Such a characteristic is made possible, notably, because of the use of a temporal classification means. Thus the temporal classification means does not select sequences of input variables of predefined length, but continues to receive input variables until it has sufficient data to determine a satisfactory solution, thus increasing the length of the sequence. The surjection between the set of inputs and the set of outputs is a surjective application of a set of input trajectories to a set of output trajectories, corresponding to the different classes of trajectory stored. For example, the application may belong to a grouping in which the system used is also capable of interpolating or extrapolating to trajectories not seen during learning. In the present application, the length of a sequence may be temporal, that is to say corresponding to a sampling period of the sequence, or metric, that is to say corresponding to a sampling distance of the sequence.

Similarly, the temporal classification means generates at its output a sequence of variables that may take any length.

Preferably, the set of inputs comprises a sequence of temporal input variables and/or a sequence of metric input variables.

According to such a variant, various classes of trajectory are stored in memory in the set of inputs, via the temporal classification, but with trajectories of different lengths for better representation of the possible cases.

Advantageously, the set of inputs comprises at least one sequence of input variables chosen from among a sequence of raw variables obtained from sensors, a sequence of variables for merged representation of an external environment of the vehicle, a sequence of variables for representation of internal parameters of the vehicle, a sequence of variables for representation of the behaviors of an agent and a sequence of variables for representation of the intentions of an agent.

In the present application, the term "representation" is taken to mean a set of data representative of an event, parameters, a state, etc. A "merged representation" is a set of data obtained from the merging of data obtained from different sensors and/or estimators.

In one embodiment, the set of outputs comprises a sequence of temporal output variables and/or a sequence of metric output variables.

Preferably, the set of outputs comprises at least an output sequence chosen from among a sequence of pairs of coordinates of route points, a sequence of abscissas of route points and a sequence of ordinates of route points.

In another embodiment, the temporal classification means is configured for using a connectionist temporal classification function.

A temporal classification function may be of various types such as: hidden Markov fields, RNN-LSTM, RNN-LSTM-CTC (connectionist). By using such a function it is possible to implement effective training of the temporal classification means.

According to yet another embodiment, the temporal classification means comprises a hidden Markov chain model and/or a recurrent neural network, preferably a recurrent neural network with a short and long term memory.

Such examples are particularly suitable for forming the temporal classification means, since they may be easily trained during an offline training phase.

According to another aspect, a method for planning a path and/or a trajectory for a motor vehicle is proposed, comprising receiving a sequence of input variables and determining, on the basis of the sequence of input variables, a control law corresponding to the path and/or the trajectory of the motor vehicle.

According to one of its general characteristics, this method comprises using a temporal classification means in a set of compact representations.

According to one embodiment, the method comprises an offline training phase of the temporal classification means in which a set of sequences of output variables corresponding, respectively, to the same maneuvers is grouped in a first-level grouping.

Such a grouping is particularly suitable for preparing the temporal classification means for the purpose of its correct operation during the inference phase.

In the present application, the expression "offline" is taken to mean that an offline phase takes place outside a period in which the vehicle is controlled by the control law, for example when the vehicle is not in movement.

According to one embodiment, during the offline training phase, for each first-level grouping, a set of sequences of variables, corresponding, respectively, to maneuvers having substantially equal implementation periods and/or substantially equal implementation distances, is grouped in a second-level grouping.

Thus the adjustment of the temporal classification means is refined even further, so as to increase the robustness of the planning without thereby increasing the calculation complexity.

In one embodiment, the method comprises the transmission by the temporal classification means of an index and at least one temporal modulation factor, the reading in a look-up table of a path associated with the transmitted index, and the temporal modulation of the path read by the temporal modulation factor transmitted.

Consequently, the method according to the invention consists, notably, in storing a number of path patterns with a degree of freedom with respect to time, which becomes a parameter. This enables the calculation complexity to be limited even further.

Advantageously, the temporal classification means transmits a temporal modulation factor in the longitudinal direction and/or a temporal modulation factor in the lateral direction.

According to yet another aspect, a computer program is proposed, comprising a code configured for implementing the method as defined above when it is executed by a processor or an electronic control unit.

Figure 2:
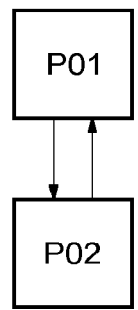
Figure 3:
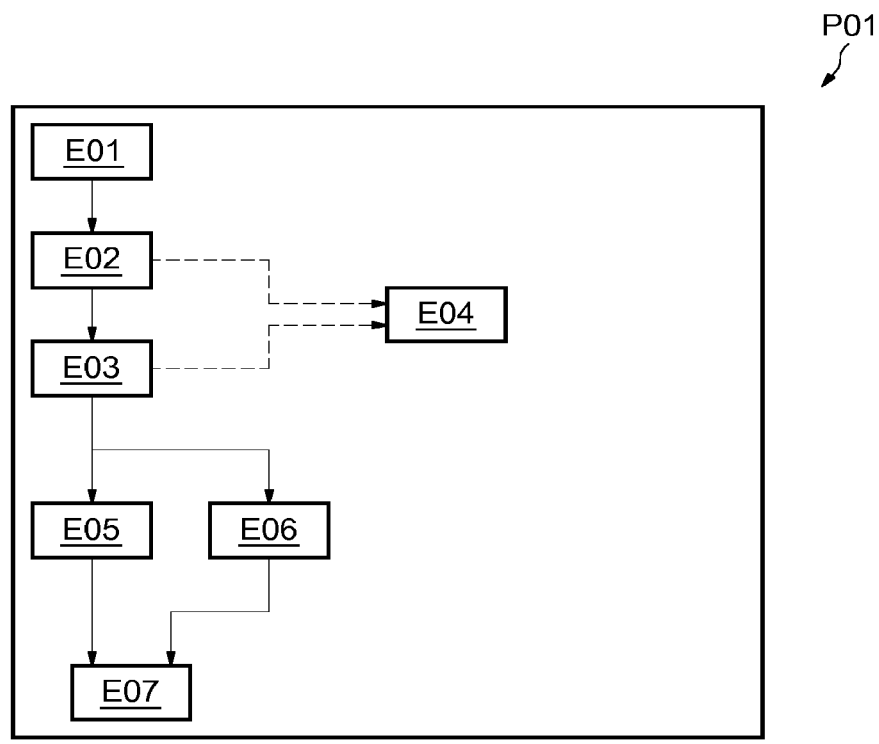
Figure 4:
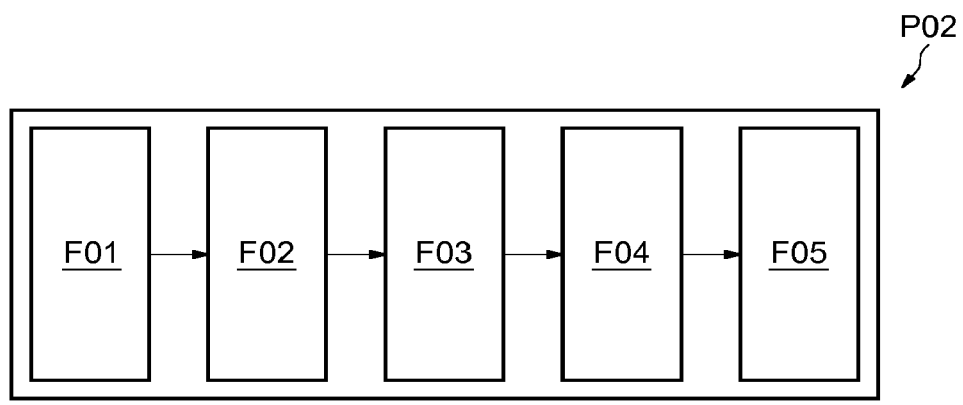
Figure 5:
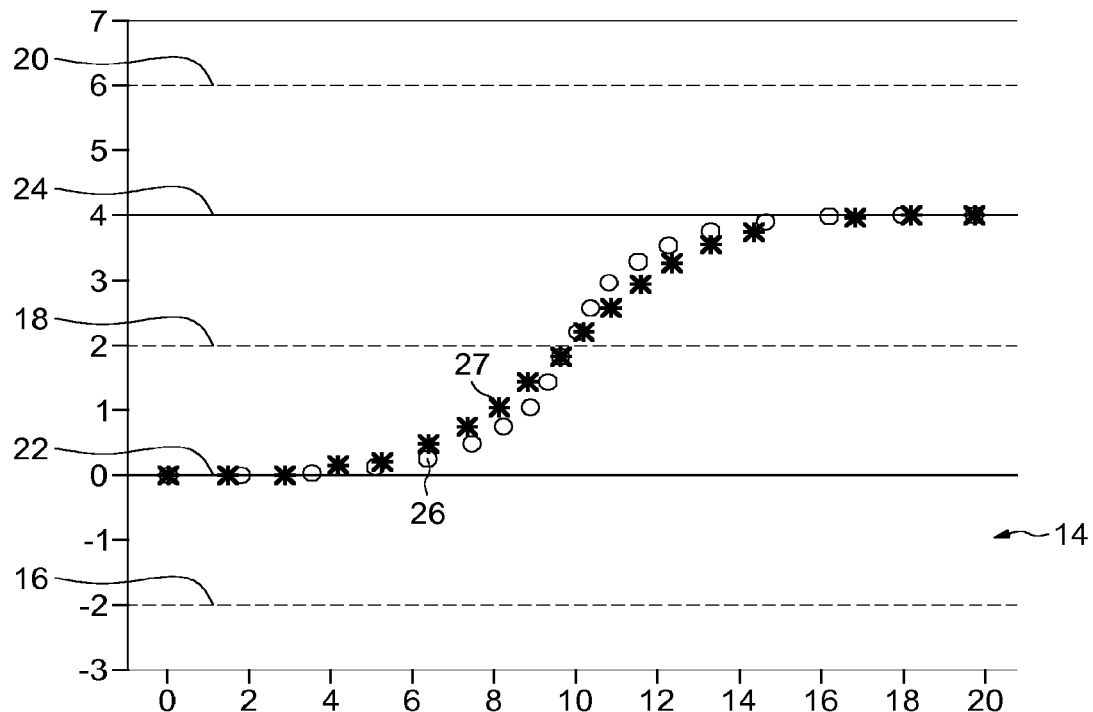
Figure 6:
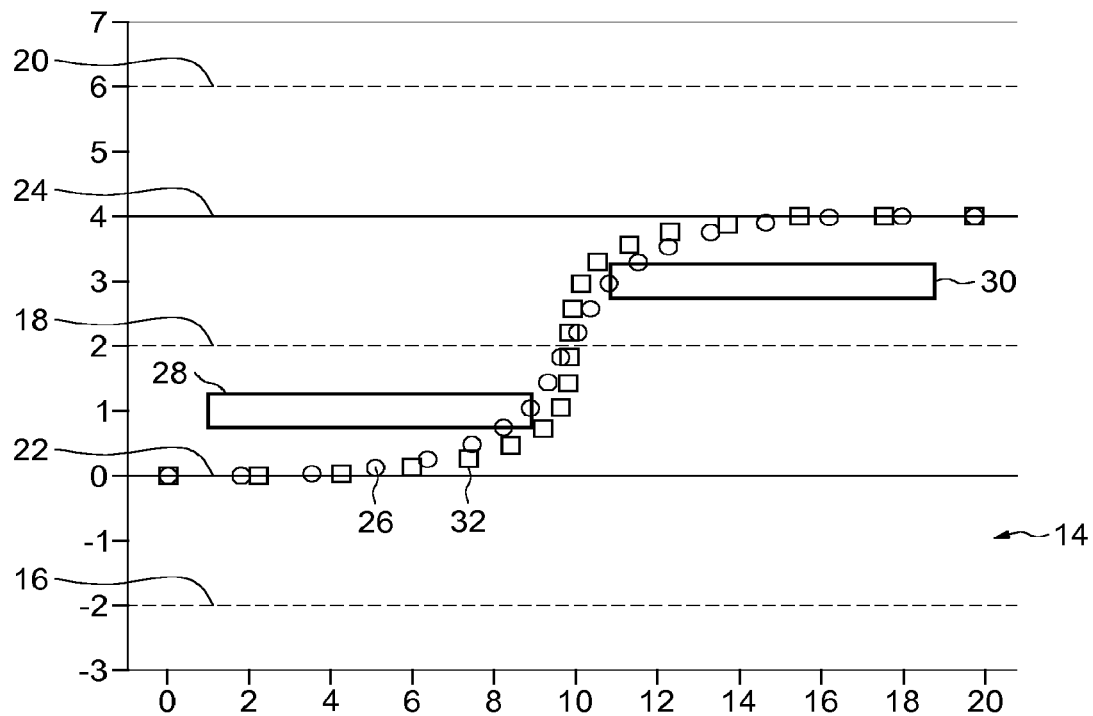

Other objects, characteristics and advantages of the invention will be apparent from a perusal of the following description, provided solely by way of non-limiting example, and given with reference to the attached drawings, in which:

FIG. 1 is a schematic representation of a planning device according to an embodiment of the invention, FIG. 2 is a schematic representation of a planning method according to an embodiment of the invention, FIG. 3 shows a first phase of the method of FIG. 2, FIG. 4 shows a second phase of the method of FIG. 2, and FIGS. 5 and 6 show schematically the choice of a path in two respective operating situations of a vehicle.

With reference to FIG. 1, a planning device 2 is schematically represented. The device 2 is intended to plan a path for a motor vehicle 4 in which it is incorporated. Evidently, it is possible to envisage the configuration of the device 2 for planning a trajectory of the vehicle 4 without departing from the scope of the invention. In the illustrated example, the vehicle 4 is autonomously driven. Without departing from the scope of the invention, it is possible to envisage a vehicle incorporating the device 2 which is not autonomously driven; that is to say, it is driven by a driver. In this case, the device 2 is intended solely to provide assistance to the driver, in a situation of danger for example.

In the illustrated example, the device 2 forms part of an autonomous driving architecture (not shown). More particularly, the device 2 is data-linked with a prediction module (not shown), a sensor merging module (not shown) and a location module (not shown), which belong to the autonomous driving architecture.

The device 2 comprises a reception module 6 data-linked with the other modules of the autonomous driving architecture and with the on-board computer of the vehicle. More precisely, the module 6 is capable of receiving a plurality of sequences of input variables. A sequence is a set of values taken by a variable. A temporal sequence is a set of values taken by a variable at a plurality of different instants. A metric sequence is a set of values taken by a variable at a plurality of different positions. In the illustrated example, the sequence is temporal and consists of values of the variable taken at a plurality of instants separated by an interval of 40 ms.

In the illustrated example, the module 6 receives a sequence of input vectors whose scalars are input variables that may be internal constraints and external constraints. The internal constraints relate, notably, to the comfort and safety of the passengers in the vehicle 4, and comprise a driver's intention, a prediction of a future maneuver, the speed of the vehicle 4, or the input of a driving mode of the vehicle 4 by a passenger. The external constraints relate, notably, to the environmental conditions and to the traffic, and comprise the position, the speed and the acceleration of other vehicles, the curvature of the road, meteorological conditions, a type of surface of the road, a daytime or nighttime condition, or information relating to visibility.

The device 2 comprises a recurrent neural network 8, commonly designated by the English term "Recurrent Neural Network", or by the corresponding acronym "RNN". Reference may be made to the document "Trajectory Generation Using RNN with Context Information for Mobile Robots", by Y.-M. Lee and J.-H. Kim, in the journal Robot Intelligence Technology and Applications [3], which mentions examples of recurrent neural networks. The recurrent neural network 8 is data-linked with the reception module 6.

In the illustrated example, the recurrent neural network 8 is of the long short term memory type. This characteristic is commonly designated by the English term "Long Short Term Memory" or by the corresponding acronym "LSTM".

The recurrent neural network 8 is configured for using a connectionist temporal classification function. Such a function is commonly designated by the English term "Connectionist Temporal Classification" or by the corresponding acronym "CTC". Consequently, the recurrent neural network 8 forms a temporal classification means for the device 2. Additionally, the use of a recurrent neural network makes it possible to generate sequences of output variables of variable lengths, by collecting sequences of input variables of variable lengths.

The recurrent neural network 8 is configured for determining and transmitting an index ind, a longitudinal modulation factor lon and a lateral modulation factor lat on the basis of the input variables received by the reception module 6. More particularly, the variables ind, lon and lat are determined so as to minimize the sum of the lateral jerks undergone by the vehicle 4 during a maneuver, while ensuring a degree of safety, avoiding any obstacles and complying with a maximum length of the maneuver.

Evidently, the invention is not limited to the use of the recurrent neural network 8. In particular, it is possible to use a hidden Markov model, also known by the English term "Hidden Markov Model" or by the corresponding acronym "HMM".

The device 2 has a look-up table 10. The table 10 may be designated by the English name "Look-Up Table", or by the corresponding acronym "LUT". The table 10 is data-linked with the recurrent neural network 8. The table 10 contains a plurality of path shapes based on an index ind. The path shapes stored in the table 10 correspond to possible paths for the vehicle 4.

The device 2 comprises a temporal modulator 12. The modulator 12 is data-linked with the recurrent neural network 8 and with the table 10. More precisely, the modulator 12 is capable of modulating respectively, with respect to time, the longitudinal and lateral position of the points forming the path delivered by the table 10, on the basis of a longitudinal and lateral modulation factor delivered by the recurrent neural network 8. In other words, the modulator 12 is capable of expanding or contracting the path delivered by the table 10. The path expanded or contracted by the modulator 12 is associated with a speed profile, which determines a temporal sequence of route points. This temporal sequence is supplied to the control law device (not shown) of the vehicle 4.

With reference to FIG. 2, this shows the main phases of a method for planning a path for the motor vehicle 4 that can be implemented by means of the device 2.

The method comprises a first phase P01 of training the recurrent neural network 8. Phase P01 is implemented when the on-board computer (not shown) of the vehicle 4 is offline, that is to say before the delivery of the vehicle 4, during servicing of the vehicle 4, or during long-term parking of the vehicle 4.

With reference to FIG. 3, phase P01 comprises a first step E01 of recording actual driver behavior. For example, the behavior of test drivers on vehicles of the same model as the vehicle 4 may be recorded. At the same time as the behavior, a type of maneuver may be recognized and recorded. For example, an action of leaving the center of a traffic lane to reach the center of a traffic lane, which may be the same lane or a different one, may be recognized and recorded.

Phase P01 comprises a second step E02 of grouping the recorded data by type of maneuver. More precisely, in step E02, a plurality of groups at a first level is created, each corresponding to a respective maneuver recorded in step E01. For example, if, during step E01, data have been recorded, respectively, for maneuvers of changing traffic lanes, maneuvers of recentering in the same traffic line, emergency braking maneuvers and emergency avoidance maneuvers of a vehicle, four first-level groups are associated with the aforesaid four maneuvers respectively.

The method comprises a third step E03 of grouping the recorded data by length of maneuver. In step E03, a plurality of groups at a second level, each corresponding to a respective length of maneuver recorded in step E01, is created in each first-level group. For example, if data have been recorded for emergency braking maneuvers over a distance of 20 meters (+/−10%), emergency braking maneuvers over a distance of 30 meters (+/−10%) and emergency braking maneuvers over a distance of 50 meters (+/−10%), respectively, the first-level group associated with the emergency braking maneuver is subdivided into three second-level groups associated, respectively, with the aforesaid three lengths of maneuver.

Phase P01 comprises a fourth step E04 of enrichment of the table 10. In step E04, the trajectories received in step E01 are used to refine the trajectories stored in the table 10.

Phase P01 comprises a step E05 of isolating distinctive characteristics associated with the different groups defined in steps E02 and E03. In particular, in step E05, the distinctive characteristics may be:

information obtained from the merging module, such as state information concerning the vehicle 4, state information concerning the surrounding objects, a map representing, for each neighboring vehicle, the position, speed and acceleration of the neighboring vehicle and the free or risk-free space around the neighboring vehicle, together with the boundary lines of the traffic lanes, information relating to the context, such as a road surface, a weather forecast, a daytime or nighttime condition, or visibility information, information relating to the vehicle 4, such as the selection of a driving mode, information on intention, such as the actual or simulated operation of an indicator, a sudden change of angle of direction, sharp braking (such that an intention of emergency braking is detected).

Phase P01 comprises a step E06 of defining the temporal classification means. In this case, the recurrent neural network 8 of the RNN-LSTM type using a CTC function is defined in step E06.

Phase P01 comprises a step E07 of training the recurrent neural network 8. Step E07 is implemented by using as inputs the set of distinctive characteristics isolated in step E05, and by using as outputs the possible trajectories recorded and grouped in steps E01, E02 and E03.

The invention is not limited to the steps described above with reference to the illustrated example. In particular, instead of using grouping techniques implemented in steps E02 and E03, competitive learning strategies could be used. Other variants that may be used are described in the publication "Trajectory clustering for motion prediction, International Conference on Intelligent Robots and Systems", by C. Sung, D. Feldman and D. Rus. [4].

With reference to FIG. 2, the method comprises a second phase P02 of inference. Phase P02 is executed online; that is to say, it is constantly implemented when the vehicle 4 is running. Although phase P01 is represented above and has been described before phase P02, phase P01 may follow and/or precede phase P02.

With reference to FIG. 4, phase P02 comprises a first step F01 of receiving a sequence of input variables. The sequence of input variables received is composed of n vectors, each vector being composed of the different input variables received by the module 10 at an instant $t_i$, where i is in the range from 1 to n. The value of the figure n is chosen so that the length of the sequence of input variables is sufficient to determine the relevant values ind, lon and lat. The input variables are substantially the same as the distinctive characteristics isolated in step E05 of phase P01, being typically data obtained from the sensor merging module and other information from certain specific sensors, such as road holding and visibility conditions, or information on intention from a behavior planner. In this example of implementation, the received sequence is temporal. Another type of sequence, notably a metric sequence, could be envisaged without departing from the scope of the invention.

Phase P02 comprises a second step F02 of entering the sequence of input variables into the recurrent neural network 8. In step F02, an index ind, a longitudinal modulation factor lon and a lateral modulation factor lat, delivered by the reception module 8, are collected.

Phase P02 comprises a third step F03 of entering the index ind into the table 10. In step F03, a path shape delivered by the table 10 is collected.

Phase P02 comprises a fourth step of temporal modulation of the path shape collected in step F03. In step F04, a longitudinal expansion or contraction of the path shape collected in step F03 relative to the factor lon is carried out, and a lateral expansion or contraction of the path shape collected in step F03 relative to the factor lat is carried out.

Phase P02 comprises a step F05 of checking for collision avoidance. In step F05, it is checked that the modulated path obtained at the end of step F04 does not entail a risk of collision of the vehicle 4 with another object. If there is a risk of collision with another object, an error signal is transmitted such that phase P02 is repeated with the selection of a different path.

FIGS. 5 and 6 show examples of paths that can be planned by the device 2 for the vehicle 4. FIG. 5 shows a first operating situation of the vehicle 4, and FIG. 6 shows a second operating situation of the vehicle 4.

FIGS. 5 and 6 schematically show a road 14 comprising a plurality of traffic lanes delimited laterally by a first boundary line 16, a second boundary line 18 and a third boundary line 20. A center line 22 of the lane located between the lines 16 and 18 and a center line 24 of the lane located between the lines 18 and 20 are also schematically shown. In the two operating situations, a path is planned to enable the vehicle 4 to change traffic lanes. The lateral speed is zero in the initial state and in the final state. The longitudinal speed is the same for the initial state and the final state.

With reference to FIG. 5, a path 26 schematically represented by a series of circles is delivered by the table 10 following the transmission of the corresponding index $ind_{56}$ by the recurrent neural network 8. The path 26 corresponds to the path shape collected in step F03 of the method according to the invention. The recurrent neural network 8 delivers a factor $lon_b$ chosen so as to minimize the sum of the lateral jerks over the whole maneuver. In the example of FIGS. 5 and 6, the factor $lat_{56}$ delivered by the recurrent neural network is equal to 1. The path 28 schematically represented by a series of crosses corresponds to the path expanded longitudinally by the modulator 12 under the effect of the factor $lon_5$ transmitted by the recurrent neural network 8. The path corresponds to the modulated path obtained at the end of step F04 of the method according to the invention. In these conditions, the vehicle 4 will follow the path 28.

With reference to FIG. 6, a first obstacle 28 and a second obstacle 30 are positioned on the road 14. The index $ind_{56}$ delivered by the recurrent neural network 8 is the same as for FIG. 5. Thus the path 26 of FIG. 5 is seen again here. However, the recurrent neural network 8 takes the presence of the obstacles 28 and 30 into account, and transmits a factor $lon_6$ to enable the obstacles 28 and 30 to be avoided. The path 32 schematically represented by a series of crosses corresponds to the path contracted longitudinally by the modulator 12 under the effect of the factor $lon_6$. The path 32 therefore corresponds to the modulated path obtained at the end of step F04, and will be the path followed by the vehicle 4 in this operating mode.

In view of the above, the invention makes it possible to provide an optimal path and/or trajectory while making allowance for all the internal constraints and external constraints that may be taken into account, while using few calculation resources in the inference phase. In particular, by using a temporal classification means, the requirement for calculation resources is transferred to an offline training phase, enabling robust planning to be obtained while limiting its complexity.

LIST OF PUBLICATIONS CITED

[1] Moritz Werling, Julius Ziegler, Sören Kammel et al. Optimal trajectory generation for dynamic street scenarios in a frenet frame. In: Robotics and Automation (ICRA), 2010 IEEE International Conference on. IEEE, 2010. pp. 987-993 (ISBN 978-1-4244-5040-4).

[2] Tim Mercy, Wannes Van Loock, Goele Pipeleers, et al. Time-optimal motion planning in the presence of moving obstacles. 2015.

[3] You-Min Lee and Jong-Hwan Kim. Trajectory Generation Using RNN with Context Information for Mobile Robots. In: Robot Intelligence Technology and Applications 4. Springer, Cham, 2017. pp. 21-29 (ISBN: 978-3-319-31291-0).

[4] Cynthia Sung, Dan Feldman, and Daniela Rus. Trajectory clustering for motion prediction. In: Intelligent Robots and Systems (IROS), 2012 IEEE/RSJ International Conference on. IEEE, 2012. pp. 1547-1552.

The invention claimed is:

1. A device for planning a path and/or a trajectory for a motor vehicle, comprising:
processing circuitry configured to
receive training data corresponding to motor vehicle usage,
group the training data based on a type of maneuver of the motor vehicle,
extract characteristics associated with each group of training data,
train a recurrent neural network (RNN) using the extracted characteristics and a trajectory of the motor vehicle associated with each group of training data when the motor vehicle is stationary,
receive a sequence of input variables, the sequence of input variables corresponding to the extracted characteristics,
generate, using the trained RNN, a set of commands for the motor vehicle based on the sequence of input variables received; and
control the motor vehicle along a trajectory according to the set of commands,
the RNN including a connectionist temporal classification function to generate a set of compact representations of the sequence of input variables.

2. The device as claimed in claim 1, wherein the processing circuitry is further configured to define a surjection of a set of inputs composed of different sequences of input variables of variable lengths toward a set of outputs composed of different sequences of output variables of variable lengths.

3. The device as claimed in claim 2, wherein the set of inputs comprises a sequence of temporal input variables and/or a sequence of metric input variables.

4. The device as claimed in claim 2, wherein the set of inputs comprises at least one sequence of input variables chosen from among a sequence of raw variables obtained from sensors, a sequence of variables for merged representation of an external environment of the vehicle, a sequence of variables for representation of internal parameters of the motor vehicle, a sequence of variables for representation of behaviors of an agent and a sequence of variables for representation of intentions of an agent.

5. The device as claimed in claim 2, wherein the set of outputs comprises a sequence of temporal output variables and/or a sequence of metric output variables.

6. The device as claimed in claim 2, wherein the set of outputs comprises at least an output sequence chosen from among a sequence of pairs of coordinates of route points, a sequence of abscissas of route points and a sequence of ordinates of route points.

7. The device as claimed in claim 1, wherein the processing circuitry is configured to execute temporal classification of the sequence of input variables via a hidden Markov chain model.

8. The device as claimed in claim 1, wherein the recurrent neural network is a long short-term memory recurrent neural network.

9. A method for planning a path and/or a trajectory for a motor vehicle, comprising:
receiving, via processing circuitry, training data corresponding to motor vehicle usage;
grouping, via the processing circuitry, the training data based on a type of maneuver of the motor vehicle;
extracting, via the processing circuitry, characteristics associated with each group of training data;
training, via the processing circuitry, a recurrent neural network (RNN) using the extracted characteristics and a trajectory of the motor vehicle associated with each group of training data when the motor vehicle is stationary;
receiving, via the processing circuitry, a sequence of input variables;
generating, via the processing circuitry, a set of commands for the motor vehicle using the RNN based on the sequence of input variables; and
controlling, via the processing circuitry, the motor vehicle along a trajectory according to the set of commands,
the RNN using a connectionist temporal classification function to generate a set of compact representations of the sequence of input variables.

10. The method as claimed in claim 9, wherein the grouping the training data further comprising grouping a set of sequences of output variables corresponding, respectively, to the same maneuvers in a first level grouping.

11. The method as claimed in claim 10, wherein, the grouping the training data further comprising grouping a set of sequences of variables corresponding, respectively, to maneuvers having substantially equal implementation periods and/or substantially equal implementation distances, in a second-level grouping.

12. The method as claimed in claim 9, further comprising:
determining, via the processing circuitry, an index and at least one temporal modulation factor;
determining, via the processing circuitry and in a look-up table, a path associated with the index; and
temporally modulating, via the processing circuitry, the path by the temporal modulation factor transmitted.

13. The method as claimed in claim 9, further comprising determining, via the processing circuitry, a temporal modulation factor in a longitudinal direction and/or a temporal modulation factor in a lateral direction.

14. A non-transitory computer readable medium storing a program that, when executed by a computer, causes the computer to execute a method, the method comprising:
receiving training data corresponding to motor vehicle usage;
grouping the training data based on a type of maneuver of the motor vehicle;
extracting characteristics associated with each group of training data;
training a recurrent neural network (RNN) using the extracted characteristics and a trajectory of the motor vehicle associated with each group of training data when the motor vehicle is stationary;
receiving a sequence of input variables;
generating a set of commands for the motor vehicle using the RNN based on the sequence of input variables; and
controlling the motor vehicle along a trajectory according to the set of commands,
the RNN using a connectionist temporal classification function to generate a set of compact representations of the sequence of input variables.

* * * * *